(12) United States Patent
Ye

(10) Patent No.: US 12,254,144 B2
(45) Date of Patent: Mar. 18, 2025

(54) TOUCH DISPLAY PANEL AND DISPLAY DEVICE

(71) Applicant: Wuhan China Star Optoelectronics Semiconductor Display Technology Co., Ltd., Hubei (CN)

(72) Inventor: Jian Ye, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/795,238

(22) PCT Filed: Jun. 14, 2022

(86) PCT No.: PCT/CN2022/098662
§ 371 (c)(1),
(2) Date: Jul. 26, 2022

(87) PCT Pub. No.: WO2023/221214
PCT Pub. Date: Nov. 23, 2023

(65) Prior Publication Data
US 2024/0184388 A1 Jun. 6, 2024

(30) Foreign Application Priority Data
May 19, 2022 (CN) .......................... 202210554426.6

(51) Int. Cl.
*G06F 3/041* (2006.01)
*G06F 3/044* (2006.01)
(52) U.S. Cl.
CPC ........ *G06F 3/0412* (2013.01); *G06F 3/04164* (2019.05); *G06F 3/0446* (2019.05); *G06F 2203/04111* (2013.01)

(58) Field of Classification Search
CPC .. G06F 3/0412; G06F 3/04164; G06F 3/0446; G06F 2203/04111
See application file for complete search history.

(56) References Cited

U.S. PATENT DOCUMENTS 10,963,111 B1\* 3/2021 Xiao ..................... G06F 3/0446
2013/0328807 A1\* 12/2013 Matsumoto ........... G02F 1/1368
345/173

(Continued)

FOREIGN PATENT DOCUMENTS

CN   105549792   5/2016
CN   106933426   7/2017

(Continued)

OTHER PUBLICATIONS

International Search Report and the Written Opinion Dated Dec. 19, 2022 From the International Searching Authority Re. Application No. PCT/CN2022/098662 and Its Translation Into English. (15 Pages).

*Primary Examiner* — Amit Chatly

(57) ABSTRACT

The present application discloses a touch display panel and a display device. In the touch display panel, a driver chip includes a plurality of first output terminals and a plurality of second output terminals; the first output terminals output display signals during a display stage, and the second output terminals are connected to touch traces in a one-to-one correspondence. Each of detecting lines is connected to an end of a corresponding one of the touch traces close to the driver chip, and a plurality of the detecting lines extend from two sides of the driver chip along a direction of the driver chip away from touch electrodes.

20 Claims, 9 Drawing Sheets

(56) References Cited

U.S. PATENT DOCUMENTS

| | | | | |
|---|---|---|---|---|
| 2014/0092326 | A1* | 4/2014 | Zhou | G02F 1/13338 |
| | | | | 349/12 |
| 2015/0060255 | A1* | 3/2015 | Chen | H03K 17/9622 |
| | | | | 200/5 R |
| 2017/0017341 | A1* | 1/2017 | Chen | G06F 3/0443 |
| 2018/0329544 | A1* | 11/2018 | Yeh | G06F 3/04164 |
| 2018/0341354 | A1 | 11/2018 | Guo | |
| 2019/0131379 | A1* | 5/2019 | Won | H10K 50/844 |
| 2021/0065596 | A1* | 3/2021 | Wu | G06F 1/1652 |

FOREIGN PATENT DOCUMENTS

| | | |
|---|---|---|
| CN | 107861658 | 3/2018 |
| CN | 111129090 | 5/2020 |
| CN | 112684945 | 4/2021 |

\* cited by examiner

TOUCH DISPLAY PANEL AND DISPLAY DEVICE

RELATED APPLICATIONS

This application is a National Phase of PCT Patent Application No. PCT/CN2022/098662 having International filing date of Jun. 14, 2022, which claims the benefit of priority of Chinese Patent Application No. 202210554426.6 filed on May 19, 2022. The contents of the above applications are all incorporated by reference as if fully set forth herein in their entirety.

FIELD AND BACKGROUND OF THE INVENTION

The present application relates to the field of display technology, and more particularly to a touch display panel and a display device.

Conventional touch structures of touch display panels include add-on touch structures, touch on cell structures, and touch in cell structures. Currently, in some touch display panels, driver chips integrated with touch functions and display functions are used to save production cost. However, as pins of the driver chips are directly bonded to lower borders of the touch display panels, it is not convenient to carry out touch fake press tests on the touch display panels when the touch display panels are in a cell state in which the driver chips are not bonded.

SUMMARY OF THE INVENTION

The present application provides a touch display panel and a display device to solve a technical problem that it is difficult to carry out touch fake press tests in a cell state when the touch display panel adopts a driver chip integrated with a touch function and a display function in the prior art.

The present application provides a touch display panel, and the touch display panel includes:
  a substrate;
  a plurality of touch electrodes disposed on the substrate;
  a plurality of touch traces disposed on the substrate, each the touch traces is connected to a corresponding one of the touch electrodes;
  a driver chip bonded to the substrate, the driver chip includes a plurality of first output terminals and a plurality of second output terminals; the first output terminals output display signals during a display stage, the second output terminals are connected to the touch traces in a one-to-one correspondence; and
  a plurality of detecting lines disposed on the substrate, each of the detecting lines is connected to an end of a corresponding one of the touch traces adjacent to the driver chip, and the plurality of detecting lines extend at two sides of the driver chip along a direction of the driver chip away from the touch electrodes.

Optionally, in some embodiments of the present application, the driver chip includes a first side edge and a second side edge adjacent to each other; an extending direction of the first side edge is perpendicular to an extending direction of the detecting lines, and the first side edge is positioned adjacent to the touch electrodes; and
  wherein the first side edge includes a central part and terminal parts positioned at two sides of the central part; the first output terminals are positioned on the central part, and the second output terminals are positioned on the second side edge and/or on the terminal parts.

Optionally, in some embodiments of the present application, the touch display panel further includes dummy terminals; the dummy terminals are positioned on the terminal parts, and the second output terminals are positioned on the second side edge.

Optionally, in some embodiments of the present application, along a first direction, the plurality of second output terminals are positioned in at least one row on the terminal parts.

Optionally, in some embodiments of the present application, along a first direction, the plurality of second output terminals are positioned in two rows on the terminal parts, and the second output terminals positioned in different rows are disposed in staggered manner.

Optionally, in some embodiments of the present application, the touch display panel further includes a third side edge and a fourth side edge; the third side edge is positioned opposite to the first side edge, and the fourth side edge is positioned opposite to the second side edge; and a part of the second output terminals is positioned on the fourth side edge.

Optionally, in some embodiments of the present application, the touch electrodes include a plurality of first touch electrodes and a plurality of second touch electrodes insulated from the first touch electrodes; the plurality of first touch electrodes are arranged at intervals along a first direction, the plurality of second touch electrodes are arranged at intervals along a second direction, and the second direction intersects the first direction; and
  the touch traces include a plurality of first touch traces and a plurality of second touch traces; each of the first touch traces is connected to a corresponding one of the first touch electrodes, and each of the second touch traces is connected to a corresponding one of the second touch electrodes.

Optionally, in some embodiments of the present application, the touch display panel further includes a touch area and a trace area surrounding the touch area, the trace area includes a first trace area and a second trace area positioned at two opposite sides of the touch area, the touch area includes a first touch area and a second touch area, and the first touch area is positioned at a side of the second touch area away from the driver chip; and
  wherein the first touch traces connected to the first touch electrodes positioned in the first touch area are positioned in the first trace area, and the first touch traces connected to the first touch electrodes positioned in the second touch area are positioned in the second trace area.

Optionally, in some embodiments of the present application, the touch display panel further includes a touch area and a trace area surrounding the touch area, and the trace area includes a first trace area and a second trace area positioned at two opposite sides of the touch area; and
  wherein a part of the first touch traces is positioned in the first trace area, and another part of the first touch traces is positioned in the second trace area; the first touch traces positioned in the first trace area are connected to the second output terminals positioned at a side of the central part adjacent to the first trace area, and the first touch traces positioned in the second trace area are connected to the second output terminal positioned at a side of the central part adjacent to the second trace area.

Optionally, in some embodiments of the present application, each of the first touch traces includes a first trace and a second trace connected to each other; the first trace is connected to a corresponding one of the first touch electrodes, and the second trace is connected to a corresponding one of the second output terminals; and wherein the first trace includes a first branch line, a second branch line, and a third branch line; the first branch line is connected to one of the first touch electrodes, the second branch line connects the first branch line and the third branch line, and the third branch line is connected to the second trace; the first branch line and the third branch line both extend along the first direction, and the third branch line is positioned at a side of the first branch line adjacent to the driver chip.

Optionally, in some embodiments of the present application, the second trace extends along the second direction; or the second trace includes a fourth branch line and a fifth branch line connected to each other; the fourth branch line is connected to the third branch line, the fifth branch line is connected to a corresponding one of the second output terminals, and the fifth branch line extends along the first direction or along the second direction.

Optionally, in some embodiments of the present application, each of the second touch traces includes a third trace and a fourth trace, the fourth trace includes a sixth branch line and a seventh branch line; and wherein the third trace is connected to an end of a corresponding one of the second touch electrodes adjacent to the driver chip, and the sixth branch line connects the third trace and the seventh branch line; the seventh branch line is connected to a corresponding one of the second output terminals, and the seventh branch line extends along the first direction or along the second direction.

Optionally, in some embodiments of the present application, the touch display panel further includes test terminals; the test terminals are positioned at a side of the driver chip away from the touch electrodes, and the test terminals are connected to the touch traces.

Optionally, in some embodiments of the present application, the touch display panel further includes a plurality of switch elements and a control signal line; control terminals of the switch elements are connected to the control signal line, input terminals of the switch elements are connected to corresponding ones of the test terminals, and output terminals of the switch elements are connected to corresponding ones of the touch traces.

Optionally, in some embodiments of the present application, the touch display panel further includes an encapsulation layer, a protective layer disposed on the encapsulation layer, a bridge conductive layer disposed on the protective layer, an insulating layer disposed on the bridge conductive layer, and a touch layer disposed on the insulating layer; and wherein the touch layer includes the touch electrodes, the touch electrodes include first touch electrodes and second touch electrodes, and each of the second touch electrodes includes a plurality of sub-touch electrodes; the bridge conductive layer includes a plurality of conductive bridges, and adjacent ones of the sub-touch electrodes are connected through a corresponding one of the conductive bridges.

Optionally, in some embodiments of the present application, the touch electrodes are hollow structures.

Correspondingly, the present application further provides a display device, the display device includes a touch display panel and a cover plate disposed on the touch display panel, and the touch display panel includes:

a substrate;

a plurality of touch electrodes disposed on the substrate;

a plurality of touch traces disposed on the substrate, each of the touch traces is connected to a corresponding one of the touch electrodes;

a driver chip bonded to the substrate, the driver chip includes a plurality of first output terminals and a plurality of second output terminals; the first output terminals output display signals during a display stage, and each of the second output terminals is connected to a corresponding one of the touch traces; and a plurality of detecting lines disposed on the substrate, each of the detecting lines is connected to an end of a corresponding one of the touch traces adjacent to driver chip, and the plurality of detecting lines extend from two sides of the driver chip along a direction of the driver chip away from the touch electrodes.

The present application provides a touch display panel and a display device. The touch display panel includes a substrate, a plurality of touch electrodes, a plurality of touch traces, a driver chip and a plurality of detecting lines disposed on the substrate. Wherein each of the touch traces is connected to a corresponding one of the touch electrodes. The driver chip includes a plurality of first output terminals and a plurality of second output terminals, the first output terminals output display signals during a display stage, the second output terminals are connected to the touch traces in a one-to-one corresponding. Each of the detecting lines is connected to an end of a corresponding one of the touch traces adjacent to the driver chip, the plurality of detecting lines extends at two sides of the driver chip along a direction of the driver chip away from the touch electrodes. The present application adopts the driver chip integrated touch property and display property, it is convenient to carry out a touch fake press test when the touch display panel is in a state of cell by arranging the detecting lines at two sides of the driver chip along the direction of the driver chip away from the touch electrodes.

BRIEF DESCRIPTION OF THE SEVERAL VIEWS OF THE DRAWINGS

Hereinafter, the accompanying figures used for the description of embodiments of the present application will be described in brief to more clearly illustrate the technical solutions of the present application. Obviously, the accompanying figures described below are only part of the embodiments of the present application, and according to these figures, those skilled in the art can derive other figures without making any inventive efforts.

DESCRIPTION OF SPECIFIC EMBODIMENTS OF THE INVENTION

In the following, the technical solutions in the embodiments of the present application will be clearly and completely described with reference to the drawings in the embodiments of the present application. Obviously, the described embodiments are only a part of the embodiments of the present application, not all of the embodiments. Based on the embodiments in the present application, all other embodiments obtained by a person of ordinary skill in the art without creative efforts shall fall within the claimed scope of the present application.

In the description of the present application, it needs to be understood that the terms "first" and "second" in this application are used for descriptive purposes only, and should not be interpreted as indicating or suggesting relative importance or implicitly indicating the number of technical features indicated. Therefore, the features defined as "first", "second", etc. may explicitly or implicitly include one or one more of the features, it should not be interpreted as limiting of the present application.

The present application provides a touch display panel and a display device, which are illustrated in detail below. It should be noted that the description order of the embodiments below is not taken as a limitation of the preferred order of the embodiments of the present application.

Figure 1:
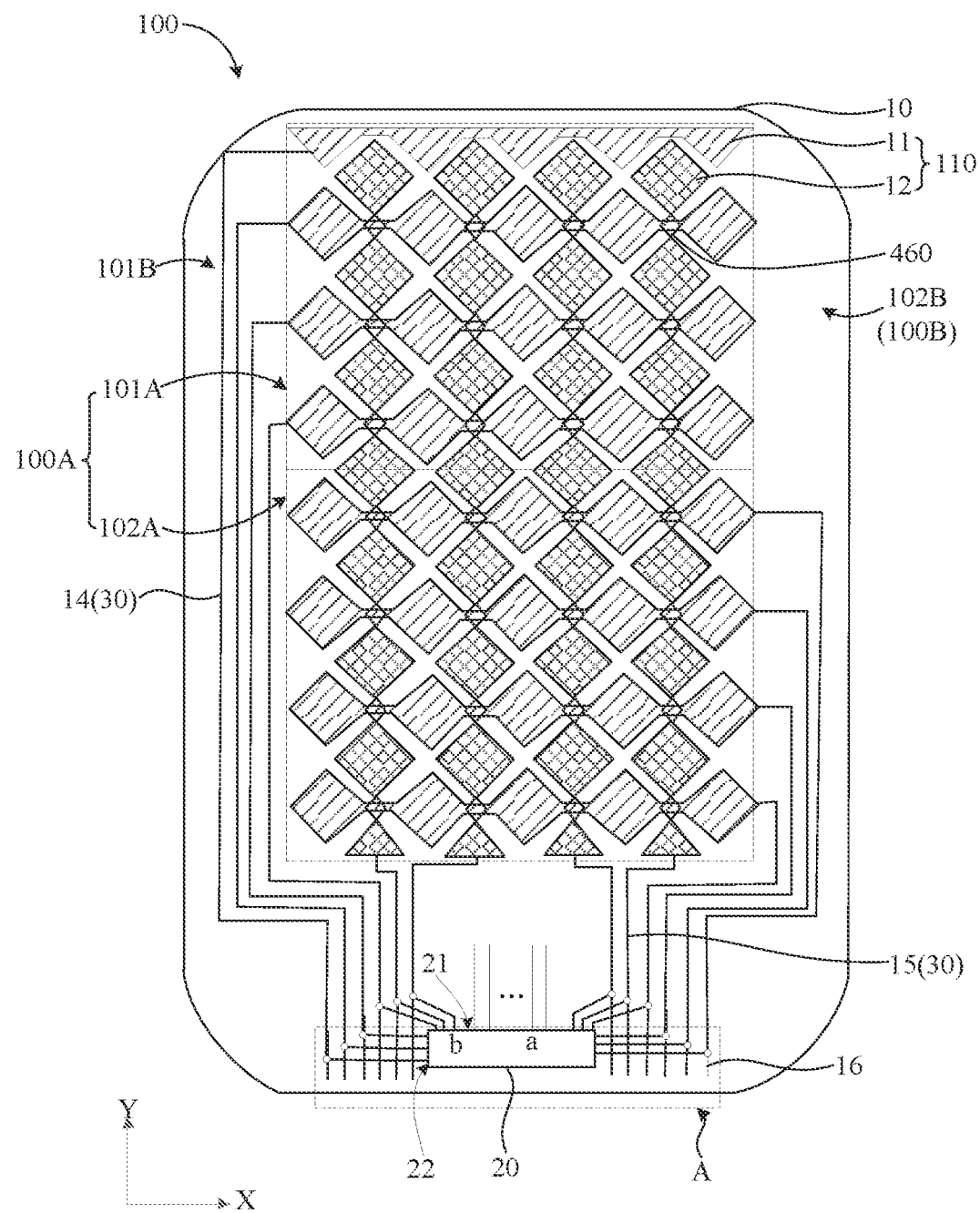
FIG. 1 is a first schematic plan diagram of a touch display panel provided by the present application.
Figure 3:
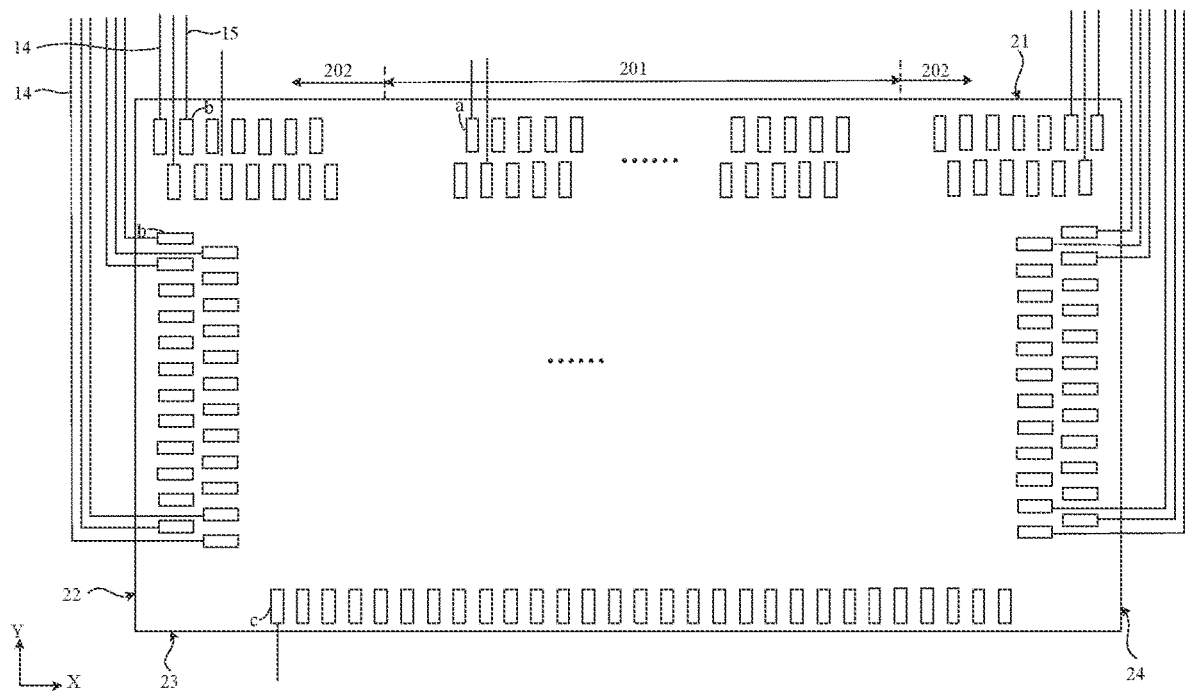
FIG. 3 is an enlarged schematic diagram of a part A in FIG. 1 provided by the present application.

Please refer to FIG. 1 and FIG. 3, FIG. 1 is a first schematic plan diagram of a touch display panel provided by the present application, and FIG. 3 is an enlarged schematic diagram of a part A in FIG. 1 provided by the present application. In an embodiment of the present application, the touch display panel 100 includes a substrate 10, a plurality of touch electrodes 110, a plurality of touch traces 30, a driver chip 20, and a plurality of detecting lines 16.

Wherein the touch electrodes 110 are disposed on the substrate 10. Wherein the plurality of touch traces 30 are disposed at intervals on the substrate 10. Each of the touch traces 30 is connected to a corresponding one of the touch electrodes 110.

Wherein the driver chip 20 is bonded to the substrate 10. The driver chip 20 includes a plurality of first output terminals and a plurality of second output terminals b. The first output terminals a output display signals during a display stage. Each of the second output terminals b is connected to one of the touch traces 30 correspondingly.

Wherein the plurality of detecting lines 16 are disposed on the substrate 10. Each of the detecting lines 16 is connected to an end of a corresponding one of the touch traces 30 adjacent to the driver chip 20. The plurality of detecting lines 16 extend from two sides of the driver chip 20 along a direction of the driver chip 20 away from the touch electrodes 110.

The embodiment of the present application uses the driver chip 20 integrated with a touch function and a display function in the touch display panel 100, which can reduce production cost of the display panel 100 and simplify manufacturing processes. In addition, it can be convenient to carry out touch fake press tests when the touch display panel 100 is in a cell state by arranging the detecting lines 16 at two sides of the driver chip 20 and extending along the direction of the driver chip 20 away from the touch electrodes 110.

It can be understood that the driver chip 20 is still not bonded to the substrate 10 when the touch display panel 100 is in the cell state. Therefore, it is impossible to detect whether the touch function is normal or not by the driver chip 20 sending touch signals. In this condition, firstly, terminals of a flexible circuit board are pressed on test terminals (not shown in FIG. 1) of the touch display panel 100 in a one-to-one correspondence by a fake press on the flexible circuit board. At this time, the flexible circuit board and test terminals are connected together without a conductive adhesive, only by slightly pressing an end of the flexible circuit board on the test terminals to keep an electrical connection between them. Then, another end of the flexible circuit board is connected to the chip to detect the touch function.

It needs to be noted that "a plurality of" occurring in the embodiment of the present application refers to at least two, and a first direction may vertically intersect a second direction, or the first direction may only intersect the second direction but not vertically intersect the second direction.

In an embodiment of the present application, the display signals may be data signals, scan signals, etc. Namely, the driver chip 20 provided by the embodiment of the present application may also simultaneously include control functions of a source driver chip and a gate driver on array (GOA).

In an embodiment of the present application, the touch display panel 100 may be a flexible organic light-emitting diode (OLED) touch display panel. The substrate 10 may be a bendable, foldable, or rollable substrate. For example, the substrate 10 may include a flexible polyimide layer of one layer, two layers, or more than two layers. The substrate 10 may also be made of an insulating material, such as polymer resins.

In an embodiment of the present application, the driver chip 20 may be bent to a back surface of the substrate 10 by bending the substrate 10.

In an embodiment of the present application, the touch display panel 100 may be a self-capacitance touch display panel or a mutual-capacitance touch display panel.

In an embodiment of the present application, the touch display panel 100 is a self-capacitance touch display panel. Wherein the touch electrodes 110 serving as sensing electrodes form capacitors with the ground.

In an embodiment of the present application, the touch display panel 100 is a mutual-capacitance touch display panel. Wherein the touch electrodes 110 include a plurality of first touch electrodes 11 and a plurality of second touch electrodes 12 being insulatedly disposed from each other. The plurality of first touch electrodes 11 are arranged at intervals along a first direction Y. The plurality of second touch electrodes 12 are arranged at intervals along a second direction X. The second direction X intersects the first direction Y. The plurality of touch traces 30 include a plurality of first touch traces 14 arranged at intervals and a plurality of second touch traces 15 arranged at intervals. Each of the first touch traces 14 is connected to a corresponding one of the first touch electrodes 11. Each of the second touch traces 15 is connected to a corresponding one of the second touch electrodes 12.

Currently, in conventional mutual-capacitance touch on cell display screens, a drive integrated circuit (DIC) and a touch integrated circuit (TIC) are two independent chips; the DIC is usually directly bonded to a lower border area of a display panel, and the TIC is disposed on a flexible printed board. For the mutual-capacitance touch display panel on which two independent DIC and TIC are disposed, the flexible printed board not only includes signal lines and devices required for display, but also includes devices related to the TIC and signal lines required for touch, which eventually lead to production cost of the touch display panel being higher and manufacturing processes being more complicated.

In view of this, in the embodiment of the present application, the touch display panel 100 is the mutual-capacitance touch display panel. The first output terminals a of the driver chip 20 can output display signals during the display stage to drive the touch display panel 100 to display normally. The second output terminals b of the driver chip 20 are connected to the first touch traces 14 and the second touch traces 15 to transmit touch signals and thus realize the touch function of the display panel. Namely, the embodiment of the present application arranges the driver chip 20 integrated with the touch function and the display function in the mutual-capacitance touch display panel, thus integrating the DIC and the TIC related to the mutual-capacitance touch display panel into one chip, which can reduce the production cost of the touch display panel 100 and simplify the manufacturing processes.

Each of the embodiments below of the present application is illustrated by taking the touch display panel 100 being the mutual-capacitance touch display panel as an example, but it should not be interpreted as a limitation of the present application.

In the embodiment of the present application, the first touch electrodes 11 and the second touch electrodes 12 may be hollow structures to improve an opening ratio and a light transmission of the touch display panel 100. Specially, the touch display panel 100 further includes a plurality of sub-pixel units (not shown) arranged in an array. The sub-pixel units may be normal RGB sub-pixel units, or may be RGBW sub-pixel units, and the present application makes no limitation thereto. Orthographic projections of the first touch electrodes 11 and the second touch electrodes 12 on the substrate 10 are arranged in stagger with orthographic projections of the sub-pixel units on the substrate 10 to further improve the opening ratio of the touch display panel 100.

In the embodiment of the present application, the first touch electrodes 11 are driving electrodes TX, and the second touch electrodes 12 are sensing electrodes RX. Or, the first touch electrodes 11 are sensing electrodes RX, and the second touch electrodes 12 are driving electrodes TX.

Figure 2:
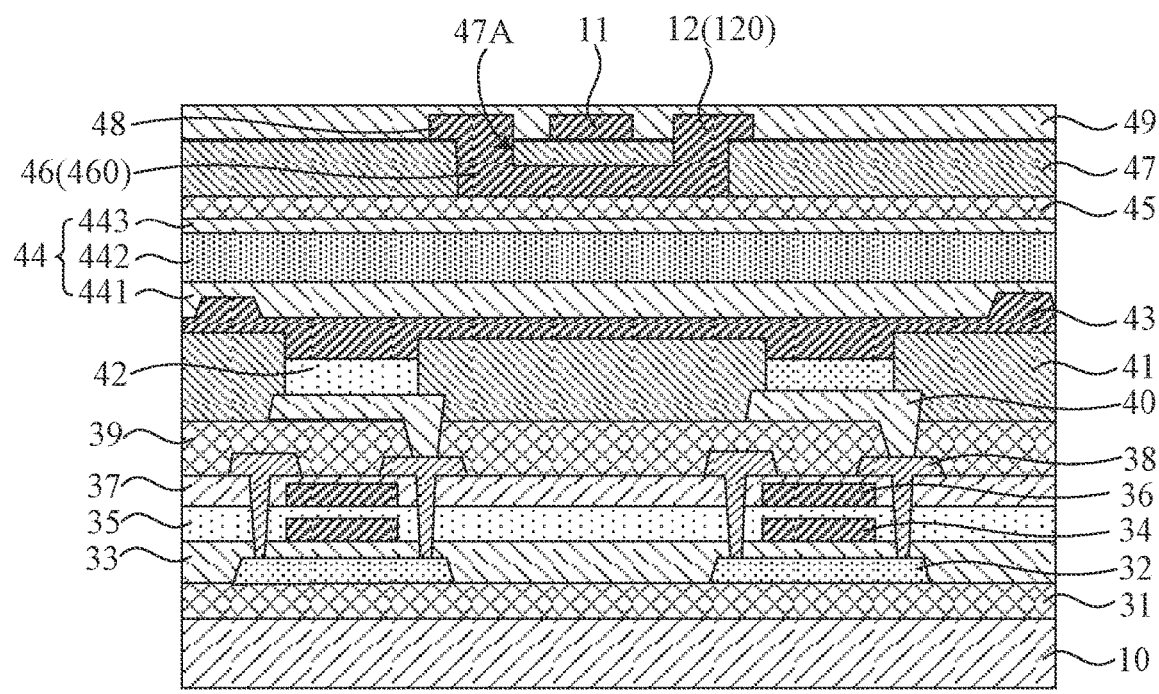
FIG. 2 is a schematic cross-sectional structural diagram of the touch display panel provided by the present application.

Please refer to FIG. 1 and FIG. 2 simultaneously, FIG. 2 is a schematic cross-sectional structural diagram of the touch display panel provided by the present application. In the embodiment of the present application, the touch display panel 100 further includes an encapsulation layer 44, a protective layer 45 disposed on the encapsulation layer 44, a bridge conductive layer 46 disposed on the protective layer 45, an insulating layer 47 disposed on the bridge conductive layer 46, and a touch layer 48 disposed on the insulating layer 47.

Wherein the touch layer 48 includes the first touch electrodes 11 and the second touch electrodes 12. The second touch electrodes 12 include a plurality of sub-touch electrodes 120. The bridge conductive layer 46 includes a plurality of conductive bridges 460. The insulating layer 47 is defined with via holes 47A. Each of the sub-touch electrodes 120 is connected to one of the conductive bridges 460 through one of the via holes 47A. Adjacent sub-touch electrodes 120 are connected to each other through a corresponding one of the conductive bridges 460.

The embodiment of the present application connects the adjacent sub-touch electrodes 120 together by arranging the conductive bridges 460 to achieve connectivity of each of the second touch electrodes 12. Therefore, the first touch electrodes 11 and the second touch electrodes 12 are insulatedly disposed on a same layer to improve touch accuracy of the touch display panel 100.

Further, in the embodiment of the present application, along a direction from the substrate 10 to the touch layer 48, the touch display panel 100 further includes a buffer layer 31, an active layer 32, a first gate insulating layer 33, a gate metal layer 34, a second gate insulating layer 35, an conductive metal layer 36, an interlayer dielectric layer 37, a source-drain metal layer 38, a planarization layer 39, a pixel electrode layer 40, a pixel definition layer 41, a light-emitting functional layer 42, and a cathode layer 43 that are sequentially disposed in a stack. The encapsulation layer 44 is disposed on a side of the cathode layer 43 away from the substrate 10. In addition, the touch display panel 100 further includes a passivation layer 49 disposed on the touch layer 48 to protect the touch layer 48.

Wherein the pixel definition layer 41 is defined with openings. The openings expose surfaces of the pixel electrode layer 40 away from the substrate 10. The light-emitting functional layer 42 is disposed in the openings. The light-emitting functional layer 42 includes, but is not limited to, a hole injection layer, a hole transport layer, a light-emitting layer, an electron transport layer, and an electron injection layer. The encapsulation layer 44 includes, but is not limited to, a first inorganic layer 441, an organic layer 442, and a second inorganic layer 443 that are alternately disposed in a stack.

It should be noted that FIG. 2 is only a schematic structural diagram of the touch display panel 100 provided by the embodiment of the present application for conveniently illustrating structures of the first touch electrodes 11 and the second touch electrodes 12, and it should not be interpreted as limiting of the present application.

Please refer to FIG. 1 and FIG. 3 simultaneously, in the embodiment of the present application, the driver chip 20 has a first side edge 21 and a second side edge 22 adjacent to each other. The first side edge 21 extends along the second direction X and is positioned adjacent to the touch electrodes 110.

Wherein the first side edge 21 includes a central part 201 and terminal parts 202 positioned at two sides of the central part 201. The first output terminals a are positioned on the central part 201, and the second output terminals b are positioned on the second side edge 22 and/or on the terminal parts 202.

The embodiment of the present application can make full use of a wiring area of the driver chip 20 to make it possible to integrate the DIC and the TIC together by positioning the first output terminals a on the central part 201 and positioning the second output terminals b on the terminal parts 202 and/or on the second side edge 22. In addition, the first output terminals a and the second output terminals b are positioned in separate areas, which can prevent interference between the display signals and the touch signals being outputted from the driver chip 20, or prevent crosstalk occurring between touch related traces and display related traces.

In the embodiment of the present application, the plurality of second output terminals b may be positioned in one row on the terminal parts 202 along the first direction Y. The plurality of second output terminals b may be positioned in two rows or in more than two rows on the terminal parts 202 along the first direction Y. The plurality of second output terminals b may be positioned in one column on the second side edge 22 along the second direction X. The plurality of second output terminals b may be positioned in two columns or in more than two columns on the second side edge 22 along the second direction X. Specially, it can be set according to requirements of the touch display panel 100.

For example, when the plurality of second output terminals b are positioned in two rows, the second output terminals b positioned in different rows are disposed in a staggered manner so that each of the first touch traces 14 and each of the second touch traces 15 may be connected to a corresponding one of the second output terminals b to prevent short circuit signals.

Similarly, in the embodiment of the present application, the plurality of first output terminals a may be disposed in one row along the first direction Y on the central part 201. The plurality of first output terminals a may be disposed in two rows or in more than two rows along the first direction Y on the central part 201. Specially, it can be set according to the requirements of the touch display panel 100.

In the embodiment of the present application, the touch display panel 100 further includes a third side edge 23 and a fourth side edge 24, the third side edge 23 is positioned opposite to the first side edge 21, and the fourth side edge 24 is positioned opposite to the second side edge 22.

In some embodiments, a part of the second output terminals b is positioned on the fourth side edge 24. The driver chip 20 further includes a plurality of input terminals c; the plurality of input terminals c are positioned on the third side edge 23, and the input terminals c are mainly used to receive power signals, etc. being inputted to the driver chip 20 from outside.

Please continue to refer to FIG. 1, in the embodiment of the present application, the touch display panel 100 includes a touch area 100A and a trace area 100B disposed around the touch area 100A. The trace area 100B includes a first trace area 101B and a second trace area 102B positioned at two opposite sides of the touch area 100A.

Wherein a part of the first touch traces 14 is positioned in the first trace area 101B, another part of the first touch traces 14 is positioned in the second trace area 102B. Each of the second touch trace 15 is connected to an end of a corresponding one of the second touch electrodes 12 adjacent to the driver chip 20. The first touch traces 14 positioned in the first trace area 101B are connected to the second output terminals b positioned at a side of the central part 201 adjacent to the first trace area 101B. The first touch traces 14 positioned in the second trace area 102B are connected to the second output terminals b positioned at a side of the central part 201 adjacent to the second trace area 102B.

The embodiment of the present application can provide more wiring areas for the first touch traces 14 by making the plurality of first touch traces 14 separately positioned in the first trace area 101B and the second traces area 102B to prevent resulting in short circuits when a quantity of the first touch traces 14 is too large. In this case, widths of the first touch traces 14 can be increased to reduce resistance. In addition, the first touch traces 14 positioned in the first trace area 101B are connected to the second output terminals b positioned at a side of the central part 201 adjacent to the first trace area 101B, and the first touch traces 14 positioned in the second trace area 102B are connected to the second output terminal b positioned at a side of the central part 201 adjacent to the second trace area 102B, which can prevent crossing and disorder between the first touch traces 14 and the second output terminals b.

In some embodiments of the present application, the touch area 100A includes a first touch area 101A and a second touch area 102A. The first touch area 101A is positioned at a side of the second touch area 102A away from the driver chip 20.

Wherein the first touch traces 14 connected to the first touch electrodes 11 positioned in the first touch area 101A are positioned in the first trace area 101B. The first touch traces 14 connected to the first touch electrodes 11 positioned in the second touch area 102A are positioned in the second trace area 102B. Therefore, the plurality of first touch traces 14 are regularly arranged, and a wiring regularity of the touch display panel 100 is improved.

Certainly, in other embodiments of the present application, the plurality of first touch electrodes 11 may be divided into even rows and odd rows along the first direction Y. The first touch traces 14 connected to the first touch electrodes 11 in odd rows are positioned in the first trace area 101B. The first touch traces 14 connected to the first touch electrodes 11 in even rows are positioned in the second trace area 102B.

Figure 4:
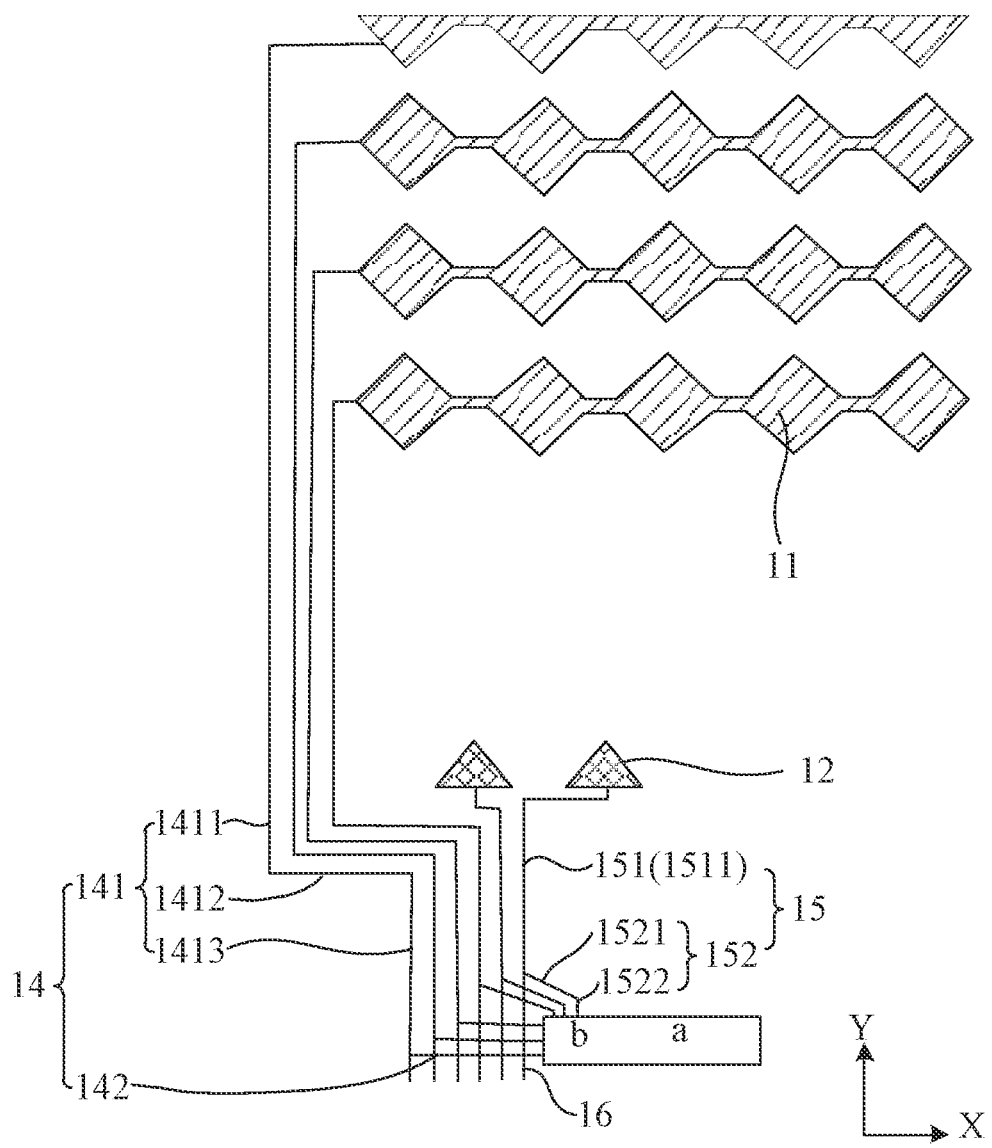
FIG. 4 is a partial schematic structural diagram in FIG. 1 provided by the present application.

Please refer to FIG. 1 and FIG. 4 simultaneously, FIG. 4 is a partial schematic structural diagram in FIG. 1 provided by the present application. In the embodiment of the present application, each of the first touch traces 14 includes a first trace 141 and a second trace 142 connected to each other. The first trace 141 is connected to a corresponding one of the first touch electrodes 11. The second trace 142 is connected to a corresponding one of the second output terminals b.

Wherein the first trace 141 includes a first branch line 1411, a second branch line 1412, and a third branch line 1413. The first branch line 1411 is connected to one of the first touch electrodes 11. The second branch line 1412 connects the first branch line 1411 and the third branch line 1413. The third branch line 1413 is connected to the second trace 142. The first branch line 1411 and the third branch line 1413 both extend along the first direction Y, and the third branch line 1413 is positioned at a side of the first branch line 1411 adjacent to the driver chip 20.

Wherein the second trace 142 extends along the first direction Y or the second direction X. It can be understood that the second trace 142 extends along the first direction Y when the second trace 142 is connected to one of the second output terminals b positioned on the terminal parts 202, the second trace 142 extends along the second direction X when the second trace 142 is connected to one of the second output terminals b positioned on the second side edge 22.

All the second traces 142 of the plurality of first touch traces 14 extend along the second direction X to further reduce wiring areas occupied by the first touch traces 14, and to improve connection accuracy between the plurality of first touch traces 14 and corresponding ones of the second output terminals b.

The embodiment of the present application can make the plurality of first touch traces 14 all get close to the driver chip 20 to reduce an area of a bonding area by arranging both the first branch line 1411 and the third branch line 1413 to extend along the first direction Y and arranging the third branch line 1413 to be positioned at the side of the first branch line 1411 adjacent to the driver chip 20.

In an embodiment of the present application, an end of the first branch line 1411 adjacent to the driver chip 20 may be flush with an end of the third branch line 1413 away from the driver chip 20. In this case, the second trace 142 extends along the second direction X.

In another embodiment of the present application, the end of the first branch line 1411 adjacent to the driver chip 20 may not be flush with the end of the third branch line 1413 away from the driver chip 20. In this case, an extending direction of the second trace 142 intersects the second direction X.

In the embodiment of the present application, the second touch traces 15 include third traces 151 and fourth traces 152. The fourth traces 152 include sixth branch lines 1521 and seventh branch lines 1522. The third traces 151 include eighth branch lines 1511.

Wherein each of the third traces 151 is connected to an end of one of the second touch electrodes 12 adjacent to the driver chip 20. The sixth branch lines 1521 connect the third traces 151 and the seventh branch lines 1522. The seventh branch lines 1522 connect with the second output terminals b. The seventh branch lines 1522 and the eighth branch lines 1511 both extend along the first direction Y, and the seventh branch lines 1522 are positioned at a side of the eighth branch lines 1511 adjacent to the driver chip 20. Therefore, it can make full use of the wiring areas to make the second touch traces 15 regularly arranged between the touch electrodes 110 and the driver chip 20.

Figure 5:
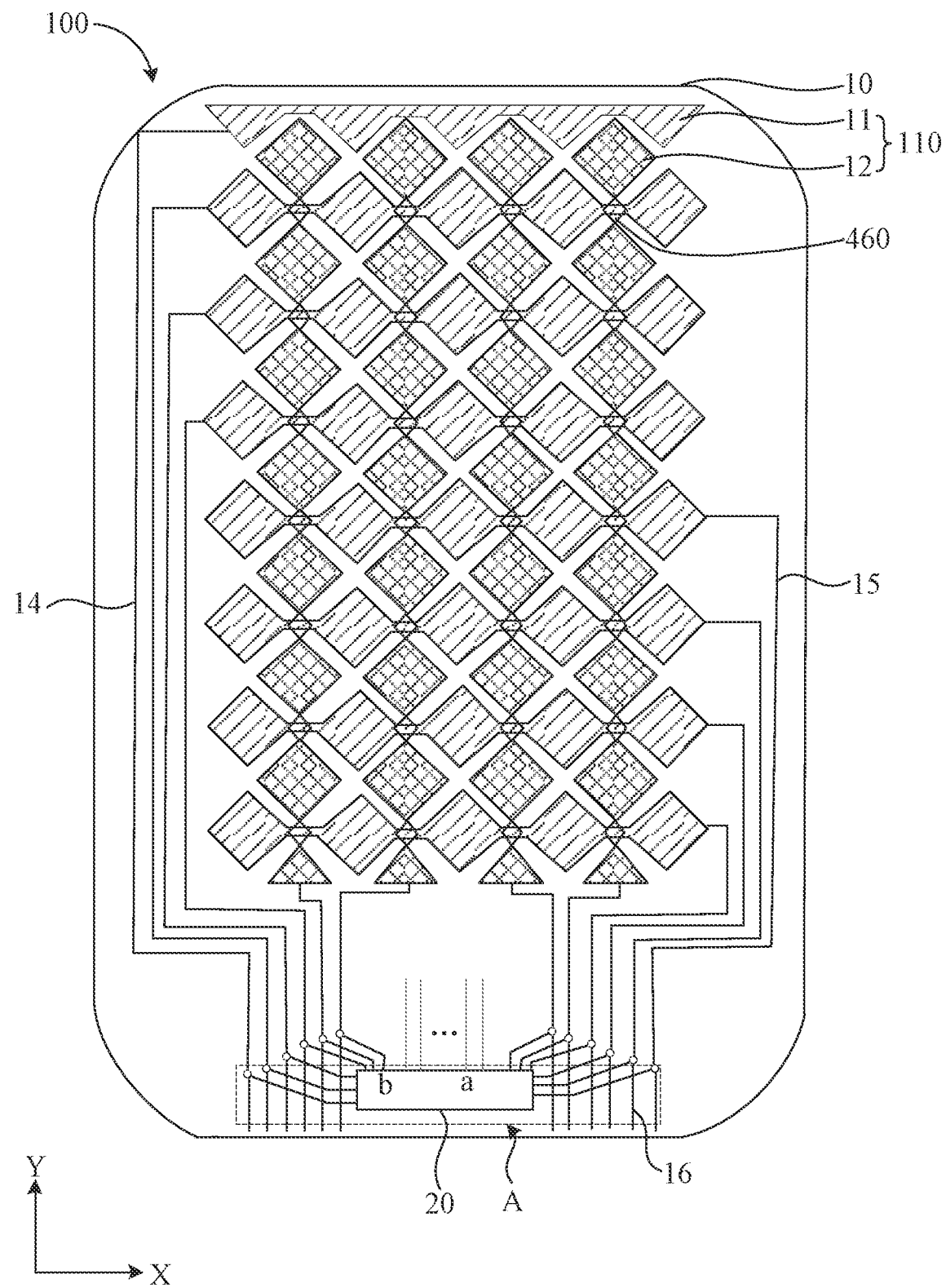
FIG. 5 is a second schematic plan diagram of the touch display panel provided by the present application.
Figure 6:
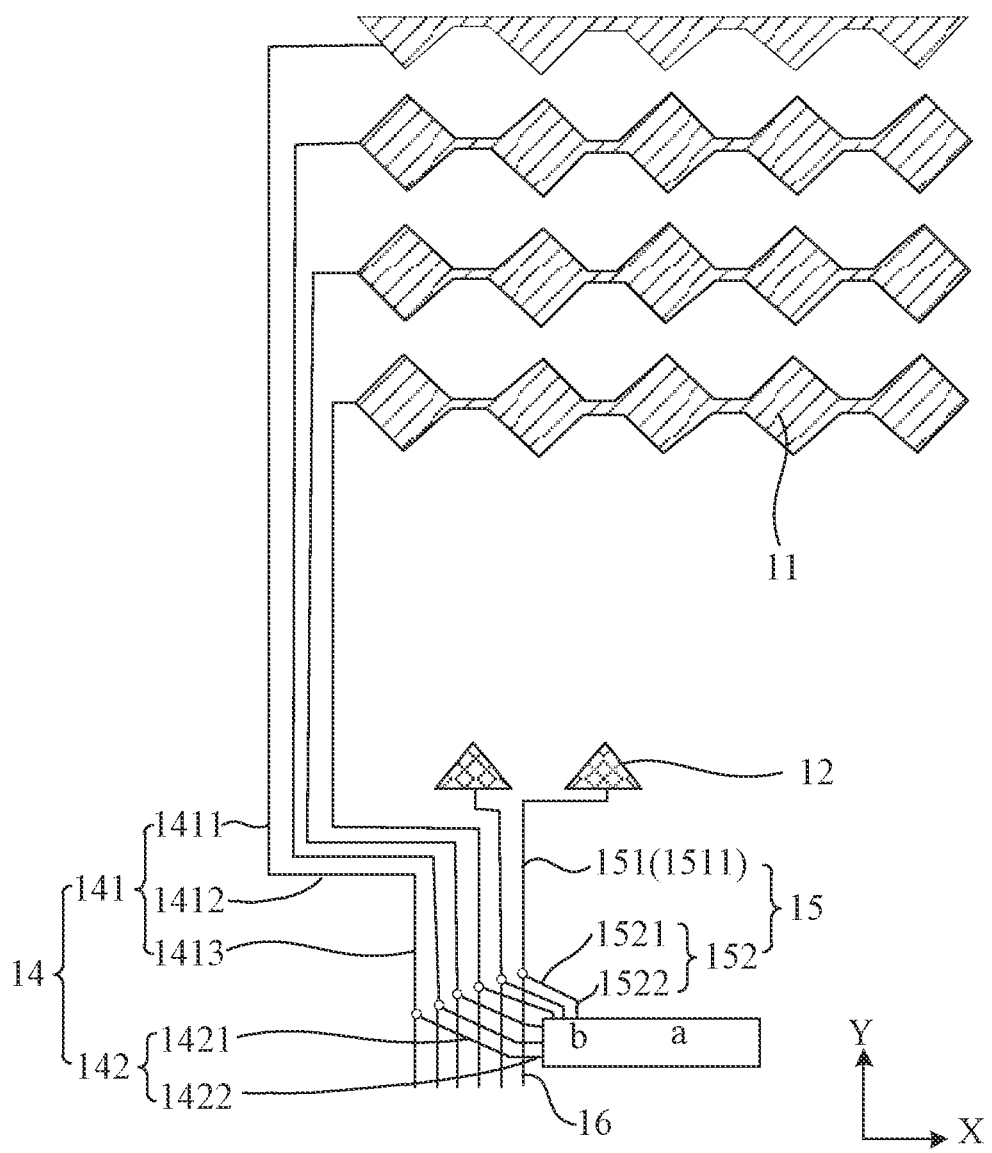
FIG. 6 is a partial schematic structural diagram in FIG. 5 provided by the present application.

Please refer to FIG. 5 and FIG. 6 simultaneously, FIG. 5 is a second schematic plan diagram of the touch display panel provided by the present application, and FIG. 6 is a partial schematic structural diagram in FIG. 5 provided by the present application. A difference from the touch display panel 100 shown in FIG. 1 is that, in an embodiment of the present application, the second trace 142 includes a fourth branch line 1421 and a fifth branch line 1422 connected to each other.

Wherein the fourth branch line 1421 connects with the third branch line 1413. The fifth branch line 1422 is connected to a corresponding one of the second output terminals b. The fifth branch line 1422 extends along the first direction Y or along the second direction X. As above, the fifth branch line 1422 extends along the first direction Y when the second trace 142 is connected to one of the second output terminals b positioned on the terminal parts 202, and the fifth branch line 1422 extends along the second direction X when the second trace 142 is connected to one of the second output terminals b positioned on the second side edge 22.

The embodiment of the present application can make the fourth branch line 1421 close to the driver chip 20 to a largest extent to further reduce the area of the bonding area by arranging the second trace 142 as the fourth branch line 1421 and the fifth branch line 1422 connected to each other.

Figure 7:
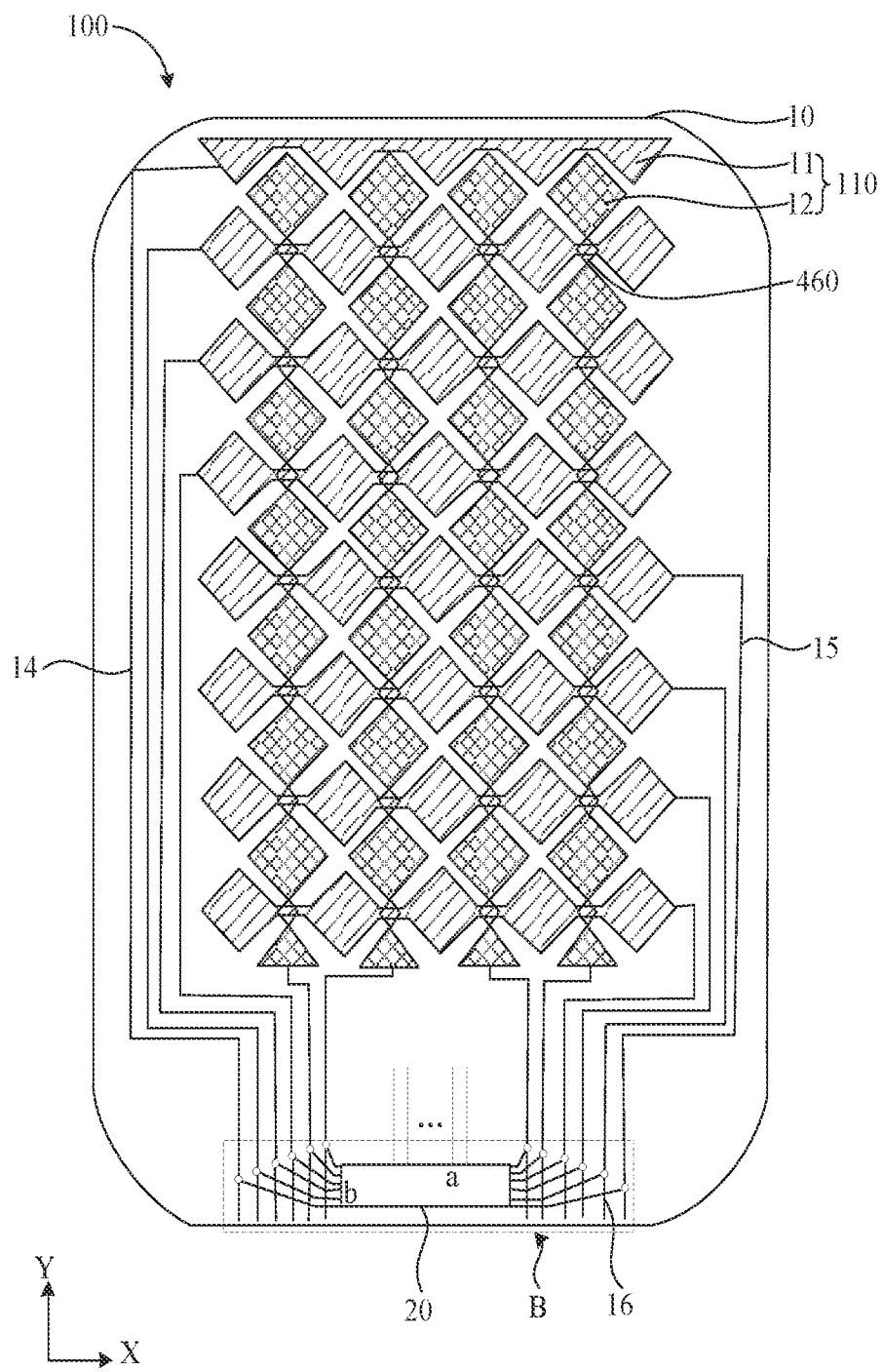
FIG. 7 is a third schematic plan diagram of the touch display panel provided by the present application.
Figure 8:
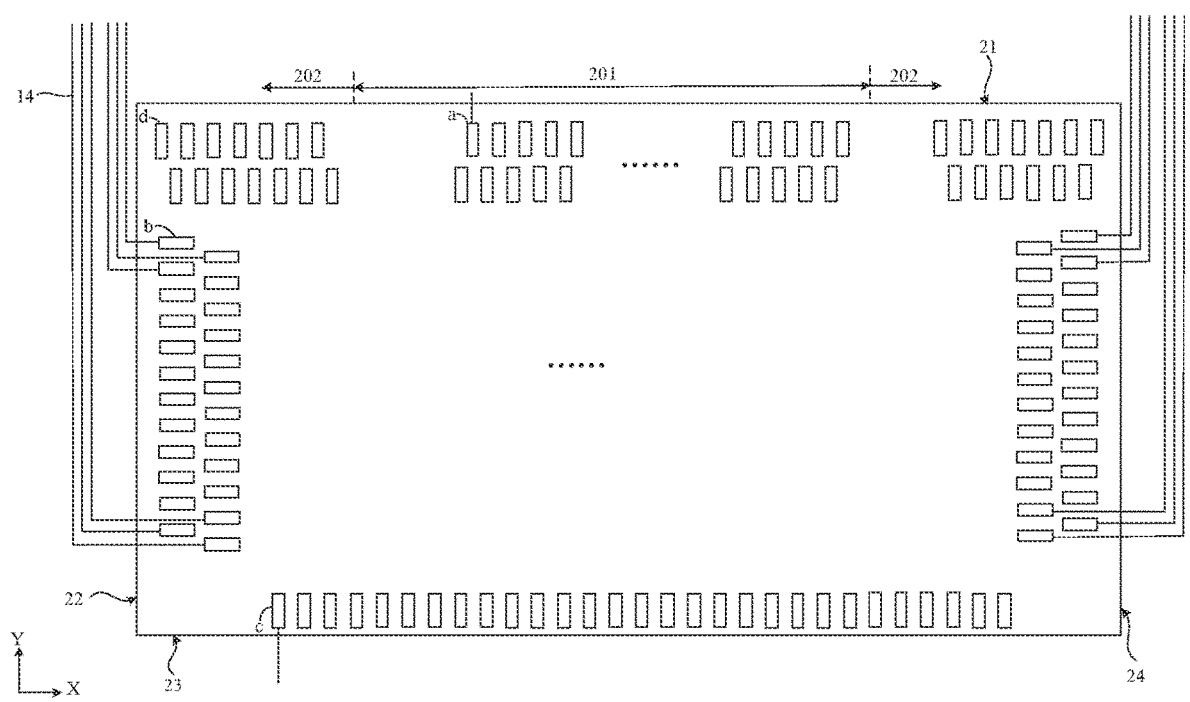
FIG. 8 is an enlarged schematic diagram of a part B in FIG. 7 provided by the present application.

Please refer to FIG. 7 and FIG. 8 simultaneously, FIG. 7 is a third schematic plan diagram of the touch display panel provided by the present application, and FIG. 8 is an enlarged schematic diagram of a part A in FIG. 7 provided by the present application. A difference between the touch display panel shown in FIG. 7 and FIG. 8 and the touch display panel 100 shown in FIG. 5 is that, in an embodiment of the present application, all of the second output terminals b are positioned on the second side edge 22 and/or the fourth side edge 24.

The embodiment of the present application can sufficiently distinguish the first output terminals a from the second output terminals b to prevent interference between the touch signals and the display signals by making the second output terminals b only positioned on the second side edge 22 and/or the fourth side edge 24.

Further, the touch display panel 100 further includes dummy terminals d, and the dummy terminals d are positioned on the terminal parts 202. Arrangements of the dummy terminals d and the first output terminals a are same. The embodiment of the present application can improve wiring uniformity of the driver chip 20 to improve bonding efficiency by arranging the dummy terminals d.

Figure 9:
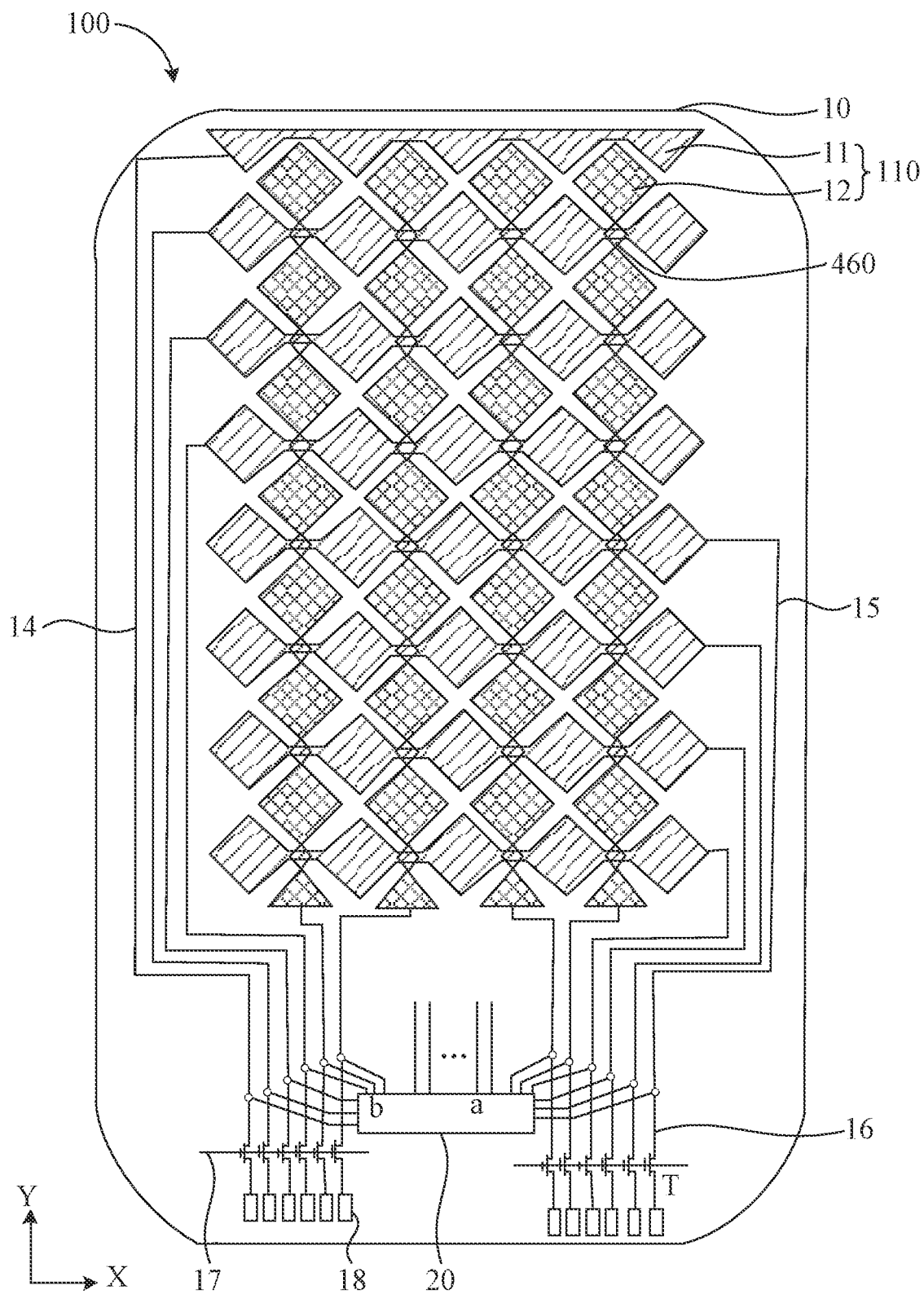
FIG. 9 is a fourth schematic plan diagram of the touch display panel provided by the present application.

Please refer to FIG. 9, FIG. 9 is a fourth schematic plan diagram of the touch display panel provided by the present application. A difference between the touch display panel shown in FIG. 9 and the touch display panel 100 shown in FIG. 5 is that, in the embodiment of the present application, the touch display panel 100 further includes test terminals 18; the test terminals 18 are positioned at a side of the driver chip 20 away from the touch electrodes 110, and the test terminals 18 are connected to the touch traces 30.

In the touch display panel 100 being the mutual-capacitance touch display panel, the test terminals 18 are provided as a plurality of test terminals 18. Parts of the test terminals are connected to corresponding ones of the first touch traces 14 through the detecting lines 16. Another parts of the test terminals are connected to corresponding ones of the second touch traces 15 through the detecting lines 16.

The embodiment of the present application makes it convenient to carry out the touch fake press tests when the touch display panel 100 is in the cell state by making the first touch traces 14 and the second touch traces 15 connect to the test terminals 18 positioned at a side of the driver chip 20 away from the touch electrodes 110, and making the plurality of detecting lines 16 extend along the first direction Y and positioned at two sides of the driver chip 20.

Please refer to FIG. 4 and FIG. 6 simultaneously, it can be seen from the embodiment mentioned above, the first trace 141 includes the first branch line 1411, the second branch line 1412, and the third branch line 1413. The third branch lines 1413 extends along the first direction Y. Therefore, it can make the third branch lines 1413 directly extend along the first direction Y to form the detecting lines 16 to simplify the processes.

Wherein the second trace 142 and the detecting lines 16 are positioned in different layers to prevent signal interference.

In the embodiment of the present application, the test terminals 18 may be removed when the driver chip 20 is bonded to reduce a bezel of the touch display panel 100.

Certainly, in other embodiments of the present application, the test terminals 18 may be reserved in the touch display panel 100. In this case, the touch display panel 100 may further include a plurality of switch elements T and a control signal line 17. Control terminals of the switch elements T are connected to the control signal line. Input terminals of the switch elements T are connected to the test terminals 18. Output terminals of the switch elements T are connected to corresponding ones of the first touch traces 14 or the second touch traces 15.

Wherein the switch elements T may be N-type transistors or P-type transistors. The switch elements T may be other devices having switch functions. The control signal line 17 is used to output a control signal to control turning on or off of the switch elements T.

Specifically, when the touch display panel 100 is touched, the control signal line 17 controls the switch elements T to turn off to disconnect electrical connections between the test terminals 18 and corresponding ones of the first touch electrodes 11 and the second touch electrodes 12, thereby preventing interference signals from the test terminals 18 to improve test sensitivity and quality of the touch display panel 100.

Figure 10:
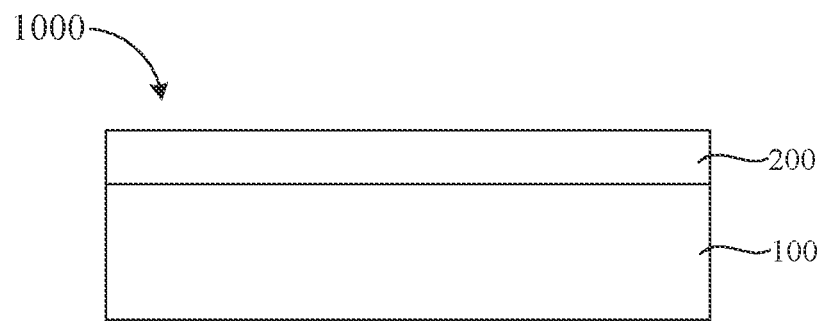
FIG. 10 is a schematic structural diagram of a display device provided by the present application.

Correspondingly, please refer to FIG. 10, FIG. 10 is a schematic structural diagram of a display device provided by the present application. Wherein the display device 1000 includes a touch display panel 100 and a cover plate 200 disposed on the touch display panel 100. The touch display panel 100 is the touch display panel of any one of the embodiments mentioned above, so it is not repeated here.

The display device 1000 and the touch display panel 100 provided by the present application include the substrate, the plurality of touch electrodes, the plurality of touch traces, the driver chip, and the plurality of detecting lines positioned on the substrate. Wherein each of the touch traces is connected to a corresponding one of the touch electrodes. The driver chip includes the plurality of first output terminals and the plurality of second output terminals; the first output terminals output display signals during the display stage, and the second output terminals are connected to the touch traces in the one-to-one correspondence. Each of the detecting lines is connected to the end of the corresponding one of the touch traces adjacent to the driver chip, and the plurality of detecting lines extend from two sides of the driver chip along the direction of the driver chip away from the touch electrodes. The present application adopts the driver chip integrated with the touch function and the display function, so it is convenient to carry out the touch fake press tests when the touch display panel is in the cell state by arranging the detecting lines at two sides of the driver chip and extending along the direction of the driver chip away from the touch electrodes.

In the above, the touch display panel and the display device provided by the present application are introduced in detail; specific individual examples are applied in the present application to explain principles and implementations of technical solutions of the present application, and the illustration of the embodiments above is only used to help understand methods and core ideas of the present application. In the meantime, there may be changes in specific implementations and application scope according to ideas of the present application for those of ordinary skill in the field. In conclusion, contents of the present specification should not be interpreted as limiting of the present application.

The invention claimed is:

1. A touch display panel, comprising:
   a substrate;
   a plurality of touch electrodes disposed on the substrate;
   a plurality of touch traces disposed on the substrate, wherein each of the touch traces includes a first end and a second end opposite to each other, and the first end of each of the touch traces is connected to a corresponding one of the touch electrodes;
   a driver chip bonded to the substrate, wherein the driver chip comprises a plurality of first output terminals and a plurality of second output terminals; the first output terminals output display signals during a display stage, and each of the second output terminals is connected to the second end of a corresponding one of the touch traces; and
   a plurality of detecting lines disposed on the substrate, wherein the detecting lines are disposed at two sides of the driver chip, one end of each of the detecting lines is connected to a portion of a corresponding one of the touch traces between the first end and the second end, and another end of each of the detecting lines is spaced apart from the driver chip and is disposed at a side of the driver chip away from the touch electrodes.

2. The touch display panel according to claim 1, wherein the driver chip has a first side edge and a second side edge adjacent to each other; an extending direction of the first side edge is perpendicular to an extending direction of the detecting lines, and the first side edge is positioned adjacent to the touch electrodes;
   wherein the first side edge comprises a central part and terminal parts positioned at two sides of the central part; the first output terminals are positioned on the central part, and the second output terminals are positioned on the second side edge and/or on the terminal parts; and
   wherein the detecting lines includes a first detecting line and a second detecting line, the second detecting line is disposed between the first detecting line and the driver chip, a length of the second detecting line is greater than a length of the first detecting line.

3. The touch display panel according to claim 2, wherein the touch display panel further comprises dummy terminals; the dummy terminals are positioned on the terminal parts, and the second output terminals are positioned on the second side edge.

4. The touch display panel according to claim 2, wherein along a first direction, the plurality of second output terminals are positioned in at least one row on the terminal parts.

5. The touch display panel according to claim 2, wherein along a first direction, the plurality of second output terminals are positioned in two rows on the terminal parts, and the second output terminals positioned in different rows are disposed in a staggered manner.

6. The touch display panel according to claim 2, wherein the touch display panel further comprises a third side edge and a fourth side edge; the third side edge is positioned opposite to the first side edge, and the fourth side edge is positioned opposite to the second side edge; and
   a part of the second output terminals is positioned on the fourth side edge.

7. The touch display panel according to claim 2, wherein the touch electrodes comprise a plurality of first touch electrodes and a plurality of second touch electrodes insulated from the first touch electrodes; the plurality of first touch electrodes are arranged at intervals along a first direction, the plurality of second touch electrodes are arranged at intervals along a second direction, and the second direction intersects the first direction; and
   wherein the touch traces comprise a plurality of first touch traces and a plurality of second touch traces; each of the first touch traces is connected to a corresponding one of the first touch electrodes, and each of the second touch traces is connected to a corresponding one of the second touch electrodes.

8. The touch display panel according to claim 7, wherein the touch display panel further comprises a touch area and a trace area surrounding the touch area; the trace area comprises a first trace area and a second trace area positioned at two opposite sides of the touch area, the touch area comprises a first touch area and a second touch area, and the first touch area is positioned at a side of the second touch area away from the driver chip; and
   wherein the first touch traces connected to the first touch electrodes positioned in the first touch area are positioned in the first trace area, and the first touch traces connected to the first touch electrodes positioned in the second touch area are positioned in the second trace area.

9. The touch display panel according to claim 7, wherein the touch display panel further comprises a touch area and a trace area surrounding the touch area, and the trace area comprises a first trace area and a second trace area positioned at two opposite sides of the touch area; and wherein a part of the first touch traces is positioned in the first trace area, and another part of the first touch traces is positioned in the second trace area; the first touch traces positioned in the first trace area are connected to the second output terminals positioned at a side of the central part adjacent to the first trace area, and the first touch traces positioned in the second trace area are connected to the second output terminal positioned at a side of the central part adjacent to the second trace area.

10. The touch display panel according to claim 9, wherein each of the first touch traces comprises a first trace and a second trace connected to each other; the first trace is connected to a corresponding one of the first touch electrodes, and the second trace is connected to a corresponding one of the second output terminals; and wherein the first trace comprises a first branch line, a second branch line, and a third branch line; the first branch line is connected to one of the first touch electrodes, the second branch line connects the first branch line and the third branch line, and the third branch line is connected to the second trace; the first branch line and the third branch line both extend along the first direction, and the third branch line is positioned at a side of the first branch line adjacent to the driver chip.

11. The touch display panel according to claim 10, wherein the second trace extends along the second direction; or the second trace comprises a fourth branch line and a fifth branch line connected to each other; the fourth branch line is connected to the third branch line, the fifth branch line is connected to a corresponding one of the second output terminals, and the fifth branch line extends along the first direction or along the second direction.

12. The touch display panel according to claim 9, wherein each of the second touch traces comprises a third trace and a fourth trace, the fourth trace comprises a sixth branch line and a seventh branch line; and wherein the third trace is connected to an end of a corresponding one of the second touch electrodes adjacent to the driver chip, and the sixth branch line connects the third trace and the seventh branch line; the seventh branch line is connected to a corresponding one of the second output terminals, and the seventh branch line extends along the first direction or along the second direction.

13. The touch display panel according to claim 1, wherein the touch display panel further comprises test terminals; the test terminals are positioned at a side of the driver chip away from the touch electrodes, and the test terminals are connected to the touch traces.

14. The touch display panel according to claim 13, wherein the touch display panel further comprises a plurality of switch elements and a control signal line;

control terminals of the switch elements are connected to the control signal line, input terminals of the switch elements are connected to corresponding ones of the test terminals, and output terminals of the switch elements are connected to corresponding ones of the touch traces.

15. The touch display panel according to claim 1, wherein the touch display panel further comprises an encapsulation layer, a protective layer disposed on the encapsulation layer, a bridge conductive layer disposed on the protective layer, an insulating layer disposed on the bridge conductive layer, and a touch layer disposed on the insulating layer; and wherein the touch layer comprises the touch electrodes, the touch electrodes comprise first touch electrodes and second touch electrodes, and each of the second touch electrodes comprises a plurality of sub-touch electrodes; the bridge conductive layer comprises a plurality of conductive bridges, and adjacent ones of the sub-touch electrodes are connected through a corresponding one of the conductive bridges.

16. The touch display panel according to claim 1, wherein the touch electrodes are hollow structures.

17. A display device, wherein the display device comprises a touch display panel and a cover plate disposed on the touch display panel, and the touch display panel comprises:

a substrate;

a plurality of touch electrodes disposed on the substrate;

a plurality of touch traces disposed on the substrate, wherein each of the touch traces includes a first end and a second end opposite to each other, and the first end of each of the touch traces is connected to a corresponding one of the touch electrodes;

a driver chip bonded to the substrate, wherein the driver chip comprises a plurality of first output terminals and a plurality of second output terminals; the first output terminals output display signals during a display stage, and each of the second output terminals is connected to the second end of a corresponding one of the touch traces; and a plurality of detecting lines disposed on the substrate, wherein the detecting lines are disposed at two sides of the driver chip, one end of each of the detecting lines is connected to a portion of a corresponding one of the touch traces between the first end and the second end, and another end of each of the detecting lines is spaced apart from the driver chip and is disposed at a side of the driver chip away from the touch electrodes.

18. The display device according to claim 17, wherein the driver chip has a first side edge and a second side edge adjacent to each other; an extending direction of the first side edge is perpendicular to an extending direction of the detecting lines, and the first side edge is positioned adjacent to the touch electrodes;

wherein the first side edge comprises a central part and terminal parts positioned at two sides of the central part; the first output terminals are positioned on the central part, and the second output terminals are positioned on the second side edge and/or on the terminal parts; and wherein the detecting lines includes a first detecting line and a second detecting line, the second detecting line is disposed between the first detecting line and the driver chip, a length of the second detecting line is greater than a length of the first detecting line.

19. The display device according to claim 18, wherein the touch display panel further comprises dummy terminals; the dummy terminals are positioned on the terminal parts, and the second output terminals are positioned on the second side edge.

20. The display device according to claim 18, wherein the touch electrodes comprise a plurality of first touch electrodes and a plurality of second touch electrodes insulated from the first touch electrodes; the plurality of first touch electrodes are arranged at intervals along a first direction, the plurality of second touch electrodes are arranged at intervals along a second direction, and the second direction intersects the first direction; and wherein the touch traces comprise a plurality of first touch traces and a plurality of second touch traces, each of the first touch traces is connected to a corresponding one of the first touch electrodes, and each of the second touch traces is connected to a corresponding one of the second touch electrodes.

* * * * *